United States Patent [19]
Hunter et al.

[11] Patent Number: 6,101,269
[45] Date of Patent: Aug. 8, 2000

[54] APPARATUS AND METHOD FOR RAPID 3D IMAGE PARAMETRIZATION

[75] Inventors: Ian W. Hunter, Lincoln; Paul G. Charette, Lexington, both of Mass.

[73] Assignee: Lifef/x Networks, Inc., Cambridge, Mass.

[21] Appl. No.: 08/994,803

[22] Filed: Dec. 19, 1997

Related U.S. Application Data

[60] Provisional application No. 60/033,893, Dec. 20, 1996.

[51] Int. Cl.$^7$ .............................. G06K 9/00; G01B 11/24
[52] U.S. Cl. ............................................ 382/154; 356/376
[58] Field of Search ....................... 250/237 G; 356/376; 359/15, 28; 355/22; 382/154

[56] References Cited

U.S. PATENT DOCUMENTS

| | | | |
|---|---|---|---|
| 4,148,587 | 4/1979 | Erdmann et al. | 356/356 |
| 4,657,394 | 4/1987 | Halioua | 356/376 |
| 4,746,211 | 5/1988 | Ruth et al. | 356/28.5 |
| 5,548,418 | 8/1996 | Gaynor et al. | 359/20 |
| 5,870,490 | 2/1999 | Takahashi et al. | 382/154 |

FOREIGN PATENT DOCUMENTS

| | | | |
|---|---|---|---|
| WO 96/25764 | 8/1996 | WIPO | H01L 27/00 |

OTHER PUBLICATIONS

Alsberg et al. Three–Dimensional Flow Visualization via Reconstruction from Successive Two–Dimensional Vector Velocity Maps. Engineering in Medicine and Biology Society, 1994. Engineering Advances: New Opportunities for Biomedical Engineers., Proceedi, Jun. 1994.

Patent Abstracts of Japan, vol. 097, No. 005, May 30, 1997 & JP 09 014914 A (Kishimoto Sangyo KK), Jan. 17, 1997.

Lulli A., et al., "Contrast variations in white–light speckle Interferometry with application to 3D profilometry," Optics Communications, vol. 124, No. 5/06, Mar. 15, 1996, pp. 550–557, XP000583811.

Pryputniewicz, Ryszard J., "Speckle Metrology Techniques and Their Applications," *International Conference On Speckle*, Henri H. Arsenault, Editor, Proc. SPIE 556, pp. 90–98 (1985).

SPIE Proceedings vol. 2909. Three–Dimensional Imaging And Laser–Based Systems for Metrology and Inspection II Editor(s): Kevin G. Harding, Industrial Technology Institute, Ann Arbor, MI, USA; Donald J. Svetkoff, View Engineering, Inc., Ann Arbor, MI, USA. Abstract only.

*Primary Examiner*—Jose L. Couso
*Assistant Examiner*—Shawn B. Cage
*Attorney, Agent, or Firm*—Bromberg & Sunstein LLP

[57] ABSTRACT

A method and apparatus for rapid three dimensional geometry parametrization of a three dimensional surface. A random speckle pattern is projected upon the surface and imaged to obtain a plurality of two dimensional digital images. The two dimensional images are processed to obtain a three dimensional characterization of the surface. The illuminated surface may be modeled to obtain a parameter set characterizing the surface based upon the two dimensional digital images.

12 Claims, 1 Drawing Sheet

APPARATUS AND METHOD FOR RAPID 3D IMAGE PARAMETRIZATION

The present application claims priority from U.S. provisional application No. 60/033,893, filed Dec. 20, 1996, which is herein incorporated by reference.

FIELD OF THE INVENTION

This invention relates to the measurement and modeling of a three dimensional surface. More particularly, this invention relates to measuring and modeling a three dimensional surface by projecting a speckle pattern upon the three dimensional surface, imaging the speckle pattern with a plurality of cameras to obtain a plurality of two dimensional digital images, and obtaining from the plurality of two dimensional digital images a three dimensional digital image and a model parameter set representing the three dimensional illuminated surface.

BACKGROUND OF THE INVENTION

Speckle techniques, both photographic and interferometric, are known to produce images of surfaces containing a rich set of spatial frequencies thereby providing spatial information on a wide range of spatial scales. A survey of speckle techniques is provided in Jones, Robert, *Holographic and speckle interferometry: a discussion of the theory, practice, and application of the techniques*, 2nd ed., Cambridge University Press (1989), which is herein incorporated by reference.

SUMMARY OF THE INVENTION

A preferred embodiment of the present invention provides a method for measuring and modeling a three dimensional surface. This method has the steps of: (i) illuminating the three dimensional surface with a speckle pattern; (ii) imaging the speckle pattern to obtain a plurality of two dimensional digital images; and (iii) processing the plurality of two dimensional digital images to obtain a three dimensional digital characterization of the illuminated three dimensional surface. A further embodiment includes the step of modeling the illuminated surface, based upon the plurality of two dimensional digital images, to obtain a parameter set characterizing the illuminated surface. In addition, the embodiment includes performing steps (i)–(iii) as outlined above more than once to provide an ensemble of speckle patterns and an ensemble of two dimensional digital images, wherein the ensemble of speckle patterns contains at least two distinct speckle patterns. In accordance with an alternate embodiment of the invention, the method also has the step of modeling the illuminated surface to obtain a parameter set characterizing the illuminated surface, wherein the modeling is based upon the ensemble of two dimensional digital images.

In accordance with a further aspect of the present invention in one of its embodiments, there is provided an apparatus for rapid three dimensional image parametrization of a three dimensional surface. The apparatus has a speckle pattern generator for providing a speckle pattern upon the three dimensional surface; a plurality of cameras for imaging the speckle pattern to provide a plurality of two dimensional digital images; and a processor in communication with the plurality of cameras for processing the plurality of two dimensional digital images to obtain a three dimensional digital characterization of the three dimensional surface. The processor may further provides a parameter set characterizing the three dimensional surface. The speckle pattern generator may have a source of optical radiation coupled through an optical fiber, as well as a speckle pattern shifter for varying the speckle pattern projected upon the three dimensional surface as a function of time. The speckle pattern shifter may be a mechanical strain inducer for applying strain to the optical fiber, and the mechanical strain inducer may be a piezoelectric element.

Yet another embodiment of the present invention is an apparatus for rapid three dimensional image parametrization of a three dimensional surface, where the apparatus comprises a speckle pattern generator for providing a speckle pattern upon the three dimensional surface; a plurality of cameras for imaging the speckle pattern to provide a plurality of two dimensional digital images; a memory in communication with the plurality of cameras for storing the plurality of two dimensional digital images; and a processor in communication with the memory for processing the plurality of two dimensional digital images to obtain a three dimensional digital characterization of the three dimensional surface.

DETAILED DESCRIPTION OF SPECIFIC EMBODIMENTS

Figure 1:
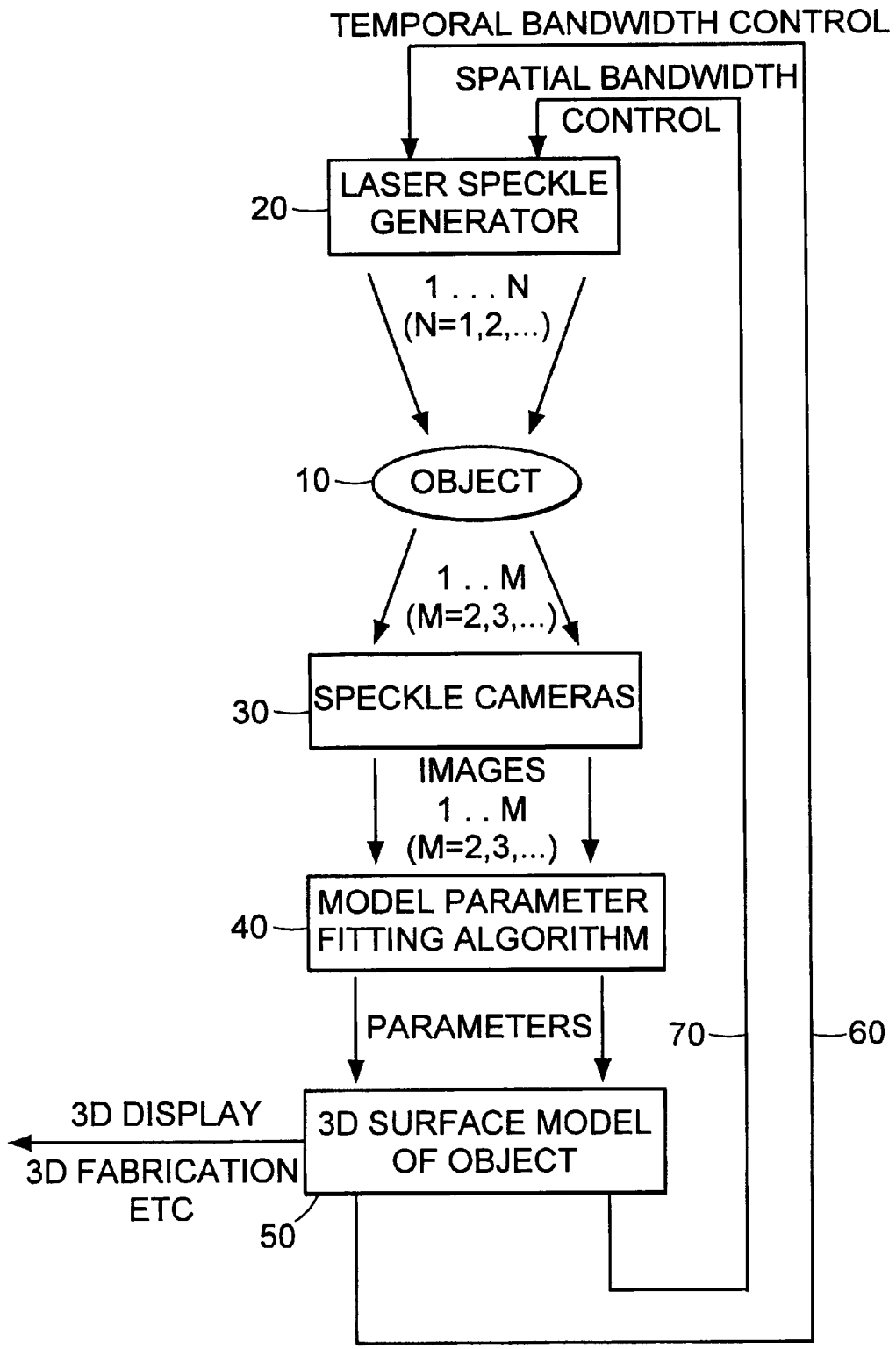
FIG. 1 illustrates a flow diagram for a preferred embodiment of the invention.

An embodiment of a method for measuring and modeling a three dimensional surface of an object is illustrated in FIG. 1. An object 10 is illuminated by a laser speckle generator 20. The techniques of the present invention are broadly applicable to various optical inspection modalities known in the art, and the application of these techniques to any of such modalities is considered within the scope of the invention and of the appended claims.

In a preferred embodiment, laser speckle generator 20 is a laser coupled to one end of an optical fiber, using optical coupling techniques known to persons of ordinary skill in the art. The end of the optical fiber distal to the laser is used to illuminate the object. The laser speckle generator projects a speckle pattern upon object 10. A speckle pattern is a pattern of illumination in which the intensity profile of the illumination appears as a realization of a random illumination pattern. A laser coupled to an inexpensive, low quality optical fiber may provide a speckle pattern, and it is this combination which serves as a speckle generator in a preferred embodiment. The speckle may be diffraction limited thereby providing a random pattern including the highest spatial frequencies attainable. Furthermore, in a preferred embodiment a mechanical strain may be applied to the optical fiber so that an entire ensemble of uncorrelated speckle patterns can be generated by changing the mechanical strain. This can be accomplished by wrapping the optical fiber around a piezoelectric material, so that a voltage applied to the piezoelectric material causes it to apply a mechanical stress to the optical fiber. In a preferred embodiment, object 10 is illuminated with an ensemble of laser speckle patterns, as indicated in FIG. 1 by the index n=1,2, 3, . . .

A plurality of cameras 30 is used to image the speckle patterns illuminated on object 10. In a preferred embodiment, cameras 30 provide digital images. Due to parallax, the images obtained from cameras 30 will be different from each other. From the differences in the digital images obtained from cameras 30, and from knowledge of the relative positions of the cameras to each other, three dimensional coordinates describing the three dimensional surface of object 10 may be obtained for each speckle illumination. Use is made of the random nature of the speckle illumination pattern in determining the differences in the digital images due to parallax. If the speckle pattern is sufficiently random, then small portions of the speckle pattern will be sufficiently different from other small portions of the speckle pattern, and determining the relative shifts of the digital images will be facilitated by making comparisons among these uniquely identifiable small portions.

Parameters of a model may be chosen to fit the digital images obtained from cameras 30 according to a model parameter fitting algorithm, as indicated in step 40 of FIG. 1. Finite element modeling of a surface is the subject of P. Charette et al., "Large deformation mechanical testing of biological membranes using speckle interferometry in transmission. II. Finite element modeling," *Applied Optics*, vol. 36(10), pp. 2246–51 (1997), which is incorporated herein by reference. The parameters may be obtained by a least squares fit using the finite element method in which the basis functions are cubic-Hermite functions. The parameters obtained from model parameter fitting step 40 are used in 50 to obtain a model of the three dimensional surface of object 10. These parameters may be used to display the three dimensional surface of object 10, or they may be used to fabricate or synthesize new three dimensional surfaces which characterize the three dimensional surface of object 10.

As indicated by flow control lines 60 and 70, the illumination and imaging process may be repeated a number of times with or without changing the speckle pattern. For example, the surface of object 10 may be changing as a function of time, in which case the process must be repeated to obtain parameter sets indexed by time. This is indicated by temporal bandwidth control line 60. There is also the spatial frequency aspects of the three dimensional surface which must be properly captured. This is indicated by the spatial bandwidth control line 70, in which object 10 is repeatedly illuminated with different speckle patterns generated by laser speckle generator 20 for each illumination step. By using different speckle patterns which are statistically uncorrelated from each other, it is possible to capture features of the surface of object 10 that might otherwise be missed if the same speckle pattern was used throughout the measurement and modeling process. Statistical averaging may be employed over the ensemble of digital images obtained by illuminating object 10 with different speckle patterns, so that a single parameter set is obtained in which the spatial features of the surface of object 10 are properly captured.

Numerous modifications may be made to the embodiments described above without departing from the spirit and scope of the invention.

What is claimed is:

1. A method for measuring and modeling a three dimensional surface, the method comprising:
   a. illuminating the three dimensional surface with a spatially random speckle pattern;
   b. imaging the speckle pattern to obtain a plurality of two dimensional digital images; and
   c. processing differences due to parallax among the plurality of two dimensional digital images to obtain a three dimensional characterization of the illuminated three dimensional surface.

2. The method as set forth in claim 1, further comprising:
   d. modeling the illuminated surface, based upon the plurality of two dimensional digital images, to obtain a parameter set characterizing the illuminated surface.

3. The method as set forth in claim 1, further comprising:
   performing steps (a)–(c) more than once to provide an ensemble of speckle patterns and an ensemble of two dimensional digital images, wherein the ensemble of speckle patterns contains at least two distinct speckle patterns.

4. The method as set forth in claim 3, further comprising:
   modeling the illuminated surface to obtain a parameter set characterizing the illuminated surface, wherein the modeling is based upon the ensemble of two dimensional digital images.

5. An apparatus for rapid three dimensional image parametrization of a three dimensional surface, the apparatus comprising:
   a speckle pattern generator for providing a spatially random speckle pattern upon the three dimensional surface;
   a plurality of cameras for imaging the speckle pattern to provide a plurality of two dimensional digital images; and
   a processor in communication with the plurality of cameras for processing differences due to parallax among the plurality of two dimensional digital images to obtain a three dimensional digital characterization of the three dimensional surface.

6. The apparatus as set forth in claim 5, wherein the speckle pattern generator comprises a source of optical radiation coupled through an optical fiber.

7. The apparatus as set forth in claim 5, further comprising a speckle pattern shifter for varying the speckle pattern projected upon the three dimensional surface as a function of time.

8. The apparatus as set forth in claim 6, further comprising a speckle pattern shifter for varying the speckle pattern projected upon the three dimensional surface as a function of time.

9. The apparatus as set forth in claim 8, wherein the speckle pattern shifter is a mechanical strain inducer for applying strain to the optical fiber.

10. The apparatus as set forth in claim 9, wherein the mechanical strain inducer is a piezoelectric element.

11. The apparatus as set forth in claim 5, wherein the processor further provides a parameter set characterizing the three dimensional surface.

12. An apparatus for rapid three dimensional image parametrization of a three dimensional surface, the apparatus comprising:
   a. a sreckle pattern generator for providing a spatially random speckle pattern upon the three dimensional surface;
   b. a plurality of cameras for imaging the speckle pattern to provide a plurality of two dimensional digital images;
   c. a memory in communication with the plurality of cameras for storing the plurality of two dimensional digital images; and
   d. a processor in communication with the memory for processing differences due to parallax among the plurality of two dimensional digital images to obtain a three dimensional digital, characterization of the three dimensional surface.

* * * * *

UNITED STATES PATENT AND TRADEMARK OFFICE
CERTIFICATE OF CORRECTION

PATENT NO. : 6,101,269
DATED : August 8, 2000
INVENTOR(S) : Ian W. Hunter and Paul G. Charette It is certified that error appears in the above-identified patent and that said Letters Patent are hereby corrected as shown below:

In the Claims section, Column #4, Claim 12, Line # 51, please change "sreckle" to -- speckle --.

Signed and Sealed this

Tenth Day of April, 2001

*Attest:*

NICHOLAS P. GODICI

*Attesting Officer*  *Acting Director of the United States Patent and Trademark Office*